(12) United States Patent
Manson (10) Patent No.: US 10,312,694 B2
(45) Date of Patent: Jun. 4, 2019

(54) MODE-BASED OUTPUT SYNCHRONIZATION USING RELAYS AND A COMMON TIME SOURCE

(71) Applicant: Schweitzer Engineering Laboratories, Inc., Pullman, WA (US)

(72) Inventor: Scott M. Manson, Moscow, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 168 days.

(21) Appl. No.: 15/631,007

(22) Filed: Jun. 23, 2017

(65) Prior Publication Data

US 2018/0375338 A1    Dec. 27, 2018

(51) Int. Cl.
| | | |
|---|---|---|
| *H02J 3/40* | (2006.01) | |
| *H02J 3/38* | (2006.01) | |
| *H02M 1/42* | (2007.01) | |
| *H02M 7/42* | (2006.01) | |

(52) U.S. Cl.
CPC ............... *H02J 3/40* (2013.01); *H02J 3/383* (2013.01); *H02J 3/386* (2013.01); *H02M 1/42* (2013.01); *H02M 7/42* (2013.01); *H02J 2003/388* (2013.01)

(58) Field of Classification Search
CPC .... H02J 3/40; H02J 3/383; H02J 3/386; H02J 2003/388; H02M 1/42; H02M 7/42
See application file for complete search history.

(56) References Cited

U.S. PATENT DOCUMENTS

| | | | |
|---|---|---|---|
| 4,349,744 A | 9/1982 | Reuther | |
| 4,387,336 A | 6/1983 | Joy | |
| 4,636,909 A | 1/1987 | Brandt | |
| 4,672,501 A | 6/1987 | Bilac | |
| 4,715,000 A | 12/1987 | Premerlani | |
| 4,829,298 A | 5/1989 | Fernandes | |
| 4,874,961 A | 10/1989 | Henderson | |
| 5,006,846 A | 4/1991 | Granville | |
| 5,224,011 A | 6/1993 | Yalla | |
| 5,341,265 A | 8/1994 | Westrom | |
| 5,398,029 A | 3/1995 | Toyama | |
| 5,446,682 A | 8/1995 | Janke | |
| 5,498,956 A | 3/1996 | Kinney | |
| 5,592,393 A | 1/1997 | Yalla | |
| 5,596,492 A | 1/1997 | Divan | |
| 5,693,404 A | 12/1997 | Shiraishi et al. | |
| 5,694,281 A | 12/1997 | Roberts | |
| 5,703,745 A | 12/1997 | Roberts | |

(Continued)

OTHER PUBLICATIONS

Robert J. Best, D. John Morrow, David J. McGowan, Peter A. Crossley, Synchronous Islanded Operation of a Diesel Generator, IEEE Transactions on Power Systems, vol. 22, No. 4, Nov. 2007.

(Continued)

*Primary Examiner* — Robert L Deberadinis (74) *Attorney, Agent, or Firm* — Justin K. Flanagan (57) ABSTRACT

The present disclosure pertains to systems and methods for selectively synchronizing one or more power conversion units of one or more distributed energy resources with a common time source when in an islanded state and with a measured phase angle of a grid when in a grid-connected state. In various embodiments, detecting whether the distributed energy resource is in a grid-connected state or an islanded state comprises microprocessor based analysis of measurement and monitoring data collected by intelligent electronic devices associated with the grid.

21 Claims, 5 Drawing Sheets

(56) References Cited

U.S. PATENT DOCUMENTS

| | | |
|---|---|---|
| 5,721,689 A | 2/1998 | Hart |
| 5,731,943 A | 3/1998 | Roberts |
| 5,805,395 A | 9/1998 | Hu |
| 5,809,045 A | 9/1998 | Adamiak |
| 5,995,911 A | 11/1999 | Hart |
| 6,028,754 A | 2/2000 | Guzman |
| 6,121,886 A | 9/2000 | Andersen |
| 6,141,196 A | 10/2000 | Premerlani |
| 6,148,267 A | 11/2000 | Premerlani |
| 6,236,949 B1 | 5/2001 | Hart |
| 6,265,881 B1 | 7/2001 | Meliopoulos |
| 6,285,917 B1 | 9/2001 | Sekiguchi |
| 6,311,307 B1 | 10/2001 | Adamiak |
| 6,313,614 B1 | 11/2001 | Persson |
| 6,324,039 B1 | 11/2001 | Gross |
| 6,341,055 B1 | 1/2002 | Guzman |
| 6,356,421 B1 | 3/2002 | Guzman |
| 6,356,471 B1 | 3/2002 | Fang |
| 6,366,864 B1 | 4/2002 | Kulidjian |
| 6,411,865 B1 | 6/2002 | Qin |
| 6,426,856 B1 | 7/2002 | Schneerson |
| 6,442,010 B1 | 8/2002 | Kasztenny |
| 6,446,682 B1 | 9/2002 | Viken |
| 6,456,056 B1 | 9/2002 | Katoh |
| 6,456,947 B1 | 9/2002 | Adamiak |
| 6,571,182 B2 | 5/2003 | Adamiak |
| 6,603,298 B2 | 8/2003 | Guzman |
| 6,608,742 B2 | 8/2003 | Schweitzer |
| 6,662,124 B2 | 12/2003 | Schweitzer |
| 6,694,270 B2 | 2/2004 | Hart |
| 6,717,394 B2 | 4/2004 | Elms |
| 6,738,269 B2 | 5/2004 | Nomiya |
| 6,757,146 B2 | 6/2004 | Benmouyal |
| 6,801,442 B2 | 10/2004 | Suzui |
| 6,815,932 B2 | 11/2004 | Wall |
| 6,839,210 B2 | 1/2005 | Roberts |
| 6,845,333 B2 | 1/2005 | Anderson |
| 6,915,186 B2 | 7/2005 | Patterson, Jr. |
| 6,934,654 B2 | 8/2005 | Benmouyal |
| 6,946,753 B2 | 9/2005 | Kernahan |
| 7,072,744 B2 | 7/2006 | Kuwabara |
| 7,116,010 B2 | 10/2006 | Lasseter |
| 7,196,884 B2 | 3/2007 | Guzman |
| 7,230,809 B2 | 6/2007 | Whitehead |
| 7,304,403 B2 | 12/2007 | Xu |
| 7,319,576 B2 | 1/2008 | Thompson |
| 7,328,114 B2 | 2/2008 | Premerlani |
| 7,356,422 B2 | 7/2008 | Schweitzer |
| 7,432,618 B2 | 10/2008 | Taylor |
| 7,453,674 B2 | 11/2008 | Kuehnle |
| 7,457,688 B2 | 11/2008 | Szepek |
| 7,480,580 B2 | 1/2009 | Zweigle |
| 7,570,469 B2 | 8/2009 | Guzman |
| 7,582,986 B2 | 9/2009 | Folkers |
| 7,630,863 B2 | 12/2009 | Zweigle |
| 7,635,967 B2 | 12/2009 | Loucks |
| 7,660,088 B2 | 2/2010 | Benmouyal |
| 7,710,693 B2 | 5/2010 | Guzman |
| 7,761,910 B2 | 7/2010 | Ransom |
| 7,856,327 B2 | 12/2010 | Schweitzer |
| 7,903,381 B2 | 3/2011 | Fischer |
| 7,930,117 B2 | 4/2011 | Guzman-Casillas |
| 8,082,367 B2 | 12/2011 | Etheridge |
| 8,346,402 B2 | 1/2013 | Guzman-Casillas |
| 8,410,633 B2 | 4/2013 | Batzler |
| 8,560,255 B2 | 10/2013 | Elwarry |
| 8,766,479 B2 | 7/2014 | Dorn |
| 8,880,368 B2 | 11/2014 | Hewitt |
| 9,128,130 B2 | 9/2015 | Seeley |
| 2001/0012984 A1 | 8/2001 | Adamiak |
| 2004/0021470 A1 | 2/2004 | Adams |
| 2004/0027748 A1 | 2/2004 | Kojovic |
| 2004/0059469 A1 | 3/2004 | Hart |
| 2004/0138834 A1 | 7/2004 | Blackett |
| 2004/0186669 A1 | 9/2004 | Benmouyal |
| 2004/0252525 A1 | 12/2004 | Aldridge |
| 2005/0144437 A1 | 6/2005 | Ransom |
| 2006/0069522 A1 | 3/2006 | Bruno |
| 2006/0224336 A1 | 10/2006 | Petras |
| 2006/0247874 A1 | 11/2006 | Premerlani |
| 2006/0259255 A1 | 11/2006 | Anderson |
| 2007/0008033 A1 | 1/2007 | Okazaki |
| 2007/0086134 A1 | 4/2007 | Zweigle |
| 2007/0100504 A1 | 5/2007 | Moxley |
| 2007/0103004 A1 | 5/2007 | Chou |
| 2007/0136013 A1 | 6/2007 | Premerlani |
| 2007/0219755 A1 | 9/2007 | Williams |
| 2007/0222294 A1 | 9/2007 | Tsukida |
| 2007/0239372 A1 | 10/2007 | Schweitzer |
| 2008/0040296 A1 | 2/2008 | Bridges |
| 2008/0122293 A1 | 5/2008 | Ohm |
| 2008/0204044 A1 | 8/2008 | Ponnaluri |
| 2008/0225452 A1 | 9/2008 | Stoupis |
| 2008/0232005 A1 | 9/2008 | Kuehnle |
| 2008/0281540 A1 | 11/2008 | Zweigle |
| 2009/0021082 A1 | 1/2009 | Loucks |
| 2009/0079266 A1 | 3/2009 | McNamara |
| 2009/0085407 A1 | 4/2009 | Venkatasubramanian |
| 2009/0088989 A1 | 4/2009 | Guzman |
| 2009/0088990 A1 | 4/2009 | Schweitzer |
| 2009/0089608 A1 | 4/2009 | Guzman |
| 2009/0091867 A1 | 4/2009 | Guzman |
| 2009/0099798 A1 | 4/2009 | Gong |
| 2009/0125158 A1 | 5/2009 | Schweitzer |
| 2009/0198383 A1 | 8/2009 | Gardner |
| 2009/0254655 A1 | 10/2009 | Kidwell |
| 2009/0276173 A1 | 11/2009 | Wang |
| 2010/0002348 A1 | 1/2010 | Donolo |
| 2010/0104847 A1 | 4/2010 | Ciavatta |
| 2010/0114390 A1 | 5/2010 | Stevenson |
| 2010/0145536 A1 | 6/2010 | Masters |
| 2010/0152910 A1 | 6/2010 | Taft |
| 2010/0161263 A1 | 6/2010 | Benmouyal |
| 2010/0198423 A1 | 8/2010 | Hirst |
| 2011/0004324 A1 | 1/2011 | Bickel |
| 2011/0022734 A1 | 1/2011 | Etheridge |
| 2011/0062708 A1 | 3/2011 | Prochaska |
| 2011/0068576 A1 | 3/2011 | Meier |
| 2011/0077885 A1 | 3/2011 | Zweigle |
| 2011/0190958 A1 | 8/2011 | Hirst |
| 2011/0213606 A1 | 9/2011 | Seaman |
| 2011/0251732 A1 | 10/2011 | Schweitzer |
| 2011/0298286 A1 | 12/2011 | Batzler |
| 2012/0033473 A1 | 2/2012 | Scharf |
| 2012/0226386 A1 | 9/2012 | Kulathu |

OTHER PUBLICATIONS

Olof Samuelsson, Helga Johannsdottir, Nils Gustavsson, Thorhallur Hrafnsson, Daniel Karlsson, Mike Kockott, Johan Salj, Arve Sollie, Power System Damping in Iceland Based on Phasor Measurements, Jul. 2, 2006.

Gabriel Benmouyal, E. O. Schweitzer, A. Guzman, Synchronized Phasor Measurement in Protective Relays for Protection, Control, and Analysis of Electric Power Systems, 29th Annual Western Protective Relay Conference, Oct. 22-24, 2002.

A.G. Phadke, Synchronized Phasor Measurement in Power Systems, IEEE Comput. Appl., vol. 6, No. 2, pp. 10-15, Apr. 1993.

Edmund O. Schweitzer, III, David Whitehead, Armando Guzman, Yanfeng Gong, Marcos Donolo, Advanced Real-Time Synchrophasor Applications, Western Protective Relay Conference, Oct. 2008.

Dale Williston, Dale Finney, Consequences of Out-of-Phase Reclosing on Feeders with Distributed Generators, Dec. 3, 2010.

Michael J. Thompson, Fundamentals and Advancements in Generator Synchronizing Systems, Dec. 9, 2010.

Michael J. Thompson, New Developments in Generator Synchronizing Systems, Feb. 10, 2011.

Greg Zweigle, Expand Synchrophasor Capabilities with the Substation Phasor Data Concentrator, Feb. 18, 2010.

Andrew Swinghamer, Create a Synchrophasor Network with the SEL-3378 Synchrophasor Vector Processor, Aug. 6, 2009.

(56) References Cited

OTHER PUBLICATIONS

Yanfeng Gong, Using Synchrophasor-Based Modal Analysis to Detect Unstable Power System Oscillations, Jun. 24, 2009.

Schweitzer Engineering Laboratories, Inc., Case Study, Powergrid Corporation—India, Using Wide-Area Synchrophasor Measurements to Improve System Reliability, Sep. 10, 2010.

Schweitzer Engineering Laboratories, Inc., SEL-3378 Instruction Manual, Apr. 4, 2008.

Schweitzer Engineering Laboratories, Inc., SEL-3530 Real-Time Automation Controller RTAC Instruction Manual, Sep. 15, 2009.

Terry L. Conrad, Distributed State Estimator at U.S. Virgin Islands Water and Power Authority St. Thomas and St. John, NASPI Working Group Meeting, Mar. 7, 2008.

A.P. Sakis Meliopoulos, George J. Cokkinides, Floyd Galvan, Bruce Fardanesh, Distributed State Estimator—Advances and Demonstration, 41st Annual Hawaii International Conference on System Sciences, Jan. 2008.

Pserc—Ali Abur andMladen Kezunovic, Sakis Meliopoulos, Enhanced State Estimation by Advanced Substation Monitoring, Power Systems Engineering Research Center, Nov. 2002.

Saman A. Zonouz and William H. Sanders, A Kalman-based Coordination for Hierarchical State Estimation: Algorithm and Analysis, 41st Annual Hawaii International Conference on System Sciences, Jan. 2008.

ABB: Improved Power System Performance through Wide Area Monitoring, Protection, and Control, Jan. 2004.

ABB, Wide Area Measurement, Monitoring, Protection and Control Industrial IT for Energy System Operation—Jan. 2003.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

M. Kezunovic, G. Latisko, Automated Monitoring Functions for Improved Power System Operation and Control, Power Engineering Society General Meeting, Jun. 12-16, 2005.

Arshad Saleem, Agent Services for Situation Aware Control of Power Systems with Distributed Generation, 2009 IEEE retrieved on Jan. 28, 2013 from the Internet <url:http://orbit.dtu.dk/fedora/objects/orbit:55496/datastreams/file_3761170/content> ].

Chanin Choniratisai, HVDC Stability Functions and Implementation in Thailand, CEPSI 2004. [retrieved on Jan. 28, 2013 from the Internet <URL://http://www.researchgate.net/CEPSI2004> ].

G.T. Heydt, C.C. Liu, A.G. Phadke, V. Villal, Solutions for the Crisis in Electric Power Supply, IEEE Computer Applications in Power, Jul. 2001.

Luc Meysenc, M. Jylhakallio, Peter Barbosa, Power Electronics Cooling Effectiveness Versus Thermal Inertia, IEEE Transactions on Power Electronics, vol. 20, No. 3, May 2005.

R.A. Walling, N.W. Miller, Distributed Generation Islanding—Implications on Power System Dynamic Performance, IEEE Power Enginnering Society Summer Meeting vol. 1, Jul. 25, 2002.

M. Ezzt, M.I. Marei, M. Abdel-Rahman, M.M. Mansour, A Hybrid Strategy for Distributed Generators Islanding Detection, IEEE PES Power Africa 2007 Conference and Exposition Johannesburg, South Africa, May 16-20, 2007.

Mats Larsson, Christian Rehtanz, Predictive Frequency Stability Control Based on Wide-Area Phasor Measurements, IEEE Power Engineering Society Summer Meeting vol. 1, Jul. 2002.

Jun Yin, Liuchen Chang, Chris Diduch, Recent Developments in Islanding Detection for Distributed Power Generation, IEEE Power Engineering, Jul. 2004.

Xiaoming Wang, Vijay Vittal, System Islanding Using Minimal Cutsets with Minimum Net Flow, IEEE Power Systems Conference and Exposition, Oct. 2004.

Dongchen Hu, Vaithianathan Venkatasubramanian, New Wide Area Algorithms for Detection and Mitigation of Angle Instability Using Synchrophasors, IEEE Power Engineering Society General Meeting, Jun. 2007.

Cooper Power Systems, Product Brief, iGR-933 Rotating Equipment Isolating Device, Nov. 2007.

Cooper Power Systems, Protective Relays, iGR-933 Rotating Equipment Isolating Device (web page) <http://www.cooperpower.com/products/protective/idea/reid.asp> visited on Sep. 3, 2009.

John Mulhausen, Joe Schaefer, Mangapathirao Mynam, Armando Guzman, Marcos Donolo, Anti-Islanding Today, Successful Islanding in the Future, Sep. 18, 2009.

Venkat Mynam, Armando Guzman, Islanding Detection and Adaptive Load Shedding, Sep. 30, 2009.

Armando Guzman, Venkat Mynam, Islanding Detection for Distributed Generation, Aug. 27, 2009.

Tyco Electronics UK Limited, Crompton Instruments, Installation and Operating Instructions R.O.C.O.F. Protection Relay, Nov. 2008.

E. Roy Hamilton, John Undrill, Paul S. Hamer, Scott Manson, Considerations for Generation in an Islanded Operation, Apr. 16, 2009.

Musaab M. Almulla, Mohammed Akhil Fazil, Nicholas Seeley, Energy Management Systems for Islanded Industrial Facilities, Jan. 23, 2009.

Boungwook Cho, Heechul Kim, Musaab M. Almulla, Nicholas C. Seeley, The Application of a Redundant Load-Shedding System for Islanded Power Plants, Oct. 20, 2008.

Gabriel Benmouyal, Angelo D'Aversa, Concurrent Implementation of 81 Frequency Elements Together with Frequency Tracking in Protective Relays: Issues and Solutions, Sep. 18, 2009.

Daqing Hou, Relay Element Performance During Power System Frequency Excursions, Aug. 24, 2007.

A. G. Phadke, J. S. Thorp, M. G. Adamiak, A New Measurement Technique for Tracking Voltage Phasors, Local System Frequency, and Rate of Change of Frequency, IEEE Transactions on Power Apparatus and Systems, vol. PAS-102, No. 5, May 1983.

P J Moore, J H Allmeling, A T Johns, Frequency Relaying Based on Instantenous Frequency Measurement, IEEE 96 WM 066-1 PWRD, 1996.

MODE-BASED OUTPUT SYNCHRONIZATION USING RELAYS AND A COMMON TIME SOURCE

TECHNICAL FIELD

The present disclosure pertains to systems and methods for synchronization of inverter outputs using a common time source during an islanded mode and using monitored relays in a grid connected mode.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Microgrid and macrogrid system may include various sources of power generation. One or more power sources may provide synchronized power according to the specification of the power grid. For example, 50 or 60 Hz oscillating waveforms are common in many geographical regions. Power generation sources that are permanently connected to the grid remain synchronized and may increase or decrease power output based on the load demand at any given time.

For instance, traditional power systems are modeled on an assumption that electricity generation from sources such as hydroelectric and thermal power plants (e.g., fossil and nuclear fueled plants) that are fully dispatachble and involve rotating synchronous generators. The rotational inertia of these power sources plays a significant role in the frequency dynamics and stability of the grid. Rotating synchronous generators are synchronized before being grid-connected and remain synchronized thereafter. However, power grids increasingly include significant amounts of intermittent energy power sources that are selectively connected to and disconnected from the grid. These intermittent power sources often include grid-tie inverters and breakers to selectively connect and disconnect the intermittent power source to and from the grid.

Similarly, microgrids increasing include relatively large amounts of intermittent energy power from photovoltaic arrays. Photovoltaic arrays and other inverter-connected power sources generally lack electromagnetic rotational components to maintain synchronization. Instead, grid-tie inverters commonly rely on phase locked loops to keep internal thyristors and/or insulated-gate bipolar transistors (IGBTs) synchronized with the fundamental oscillating waveform of the grid (e.g., 50 or 60 Hz). Microgrids may be connected to a macrogrid in a grid-connected state, during which energy sources connected to the microgrid must be synchronized with the power from the macrogrid.

In many instances, intermittent power sources, such as photovoltaic arrays, are distributed across a wide geographic area. Groups of photovoltaic arrays or other intermittent power sources may be aptly referred to as distributed energy resources (DERs) because they are geographically distributed relative to the grid. Each DER may include, for example, one or more photovoltaic arrays. Each DER may be selectively connected to the grid (e.g., directly to a macrogrid or via a microgrid that can be disconnected from the macrogrid) via a single inverter or multiple inverters. Multi-inverter DERs may include one or more grid-tie inverters that are relatively close together. In contrast, the grid-tie inverter(s) of a first DER may be relatively distant from the grid-tie inverter(s) of second DER.

When grid-connected, each DER may directly monitor the fundamental oscillating waveform of the macrogrid to maintain phase alignment. Accordingly, a plurality of DERs distributed throughout a macrogrid may each include one or more grid-tie inverters that are synchronized with the macrogrid and with each other. As previously described, each DER may include one or more controllers and one or more phase locked loops to ensure phase alignment of the grid-tie inverter(s) with the macrogrid. Any of a wide variety of controllers, timing components, and the like may be integrated or used with a phase angle adjuster to adjust the phase angle of the output AC power of a DER based on a measured phase angle of a connected power grid.

However, in an islanded mode a DER may lose access to the macrogrid's fundamental oscillating waveform. In some embodiments, the phase lock loop(s) and/or other phase angle adjustment components may maintain a constant frequency (e.g., 50 or 60 Hz) as the DER continues to provide power to a microgrid, but phase alignment relative to the now disconnected macrogrid may begin to drift. For example, a time alignment error of 46 microseconds corresponds to a one-degree phase misalignment in a 60 Hz system. Many grid-tie control and monitoring systems will report an error, discontinue grid re-connection, and/or otherwise fail to connect an inverter to a macrogrid (e.g., via a microgrid-to-macrogrid connection assembly) if the misalignment is more than five degrees, or approximately 231 microseconds in a 60 Hz system.

A single DER with multiple grid-tie inverters may experience drifts in phase alignment between each of the grid-tie inverters if they feed different disconnected or loosely connected portions (e.g., via transformers or high voltage transmission lines) of a microgrid. The speed at which a DER and associated microgrid can be reconnected to the macrogrid (e.g., transitioning from the islanded mode to the grid-connected mode) may be reduced because each of the phase locked loops may need to synchronize with each other and the macrogrid prior to the grid-tie invertors being reconnected.

Another problem relates to alignment drift between inverters of different DERs. As previously noted, multiple DERs and associated microgrids may be connected to a single macrogrid over a wide geographic region. The DERs may or may not be communicatively connected and may drift relative to one another at different drift rates. Accordingly, if a load demand on grid increases and re-energization of multiple DERs is desired, the delay with which each DER can be serially reconnected may vary based on an unknown phase angle drift of each DER. Thus, in many existing systems is not possible to estimate when a "reconnect" signal should be sent by a grid controller to optimally time the reconnection of multiple DERs.

In some embodiments, a control system may initialize a conventional generator (such as a diesel reciprocating engine) in each DER to provide a stable voltage reference source to the DER. The DER may use the stable voltage reference source to phase-align one or more grid-tie inverters in preparation for a grid tie. Another approach is to connect DER inverters sequentially (e.g., serially) or in a staggered sequence, but this has limited success as the harmonic content from inverters may impact the phase angle locking abilities of other phase locked loops for other inverters in the system.

In the example descriptions above, the DERs include grid-tie inverters for intermittent energy sources such as photovoltaic arrays that require conversion from direct current (DC) to alternating current (AC) before being grid connected. It is appreciated that other DERs may include intermittent energy sources that produce alternating current (AC), such as windfarms. Such DERS may not require conversion from DC to AC, since the power is generated as AC power. Nevertheless, a power conversion unit may still condition the voltage and/or phase of the power produced by the intermittent energy sources.

Thus, the examples of grid-tie inverters user herein are one type of a grid-tie power conversion unit. A grid-tie power conversion unit, or simply power conversion unit, may comprise one or more components to receive input power from an intermittent power source with a specific voltage, frequency, and/or phase angle. The grid-tie power conversion unit converts the input power into output power for connection to the grid. The output power of the grid-tie power conversion unit ideally matches the voltage, frequency, and phase angle of the grid. In the case of DC input, the power conversion unit may be a grid-tie inverter and the input frequency and phase angle of the input power may be zero.

The present disclosure includes various systems and methods for synchronizing grid-tie power conversion units, such as grid-tie inverters, between DERs or within the same DER. In some embodiments, each DER includes one or more controllers in communication with one or more grid-tie inverters. The DER may receive an accurate time signal from a time source, such as a global positioning satellite (GPS) system. The accuracy of the time signal may be sub-microsecond.

According to various embodiments, the time signal can be used by the inverters and/or other power conversion units within one or more DERs to synchronize their phase lock loops to less than one electrical degree angle during an islanding event (e.g., in an islanded mode or state). Each DER can be energized and/or reconnected to the grid simultaneously or in rapid succession because the phase angles of the grid-tie power conversion units remain synchronized regardless of geographic location. For example, multiple DERs can be reconnected to the grid in parallel. Phase lock loop synchronization using a common time source eliminates or reduces the concern typically associated with the distance between various distributed energy bridges.

A DER may be cable of synchronizing its power conversion unit(s) based on a common time signal or based on measured values from a connected microgrid or a macrogrid to which the microgrid is connected. A DER may have difficulty in determining it is in an islanded state or in a grid-connected state. In some embodiments, a DER controller may be in communication with one or more DERs and one or more relays distributed throughout the microgrid and/or macrogrid. The DER controller may receive information from one or more (e.g., hundreds) of relays that monitor breaker statuses, voltages, frequencies, current levels, synchrophasors, etc. The DER controller may detect whether each DER is in an islanded mode or a grid-connected mode based on a determined grid topology (e.g., which breakers are open and which are closed). Furthermore, the DER controller may also detect whether each DER is grid-connected to just a microgrid or also to a macrogrid.

In various embodiments, the DER controller may determine a connection status for each DER (islanded or grid-connected) and direct each DER to either synchronize its power conversion unit(s) based on measured microgrid values, based on measured macrogrid values, or using a common time source signal (e.g., IRIG, NPT, GPS-based, pulsed time signals, or PTP). In some embodiments, the DER controller may directly provide a synchronization signal using any of a wide variety of communication protocols and hardware, including both wired and wireless communication hardware.

In some embodiments, an DER controller may control the synchronization of one or more DERs and may also control the connection and/or disconnection of the one or more DERs from a microgrid or macrogrid. In some embodiments, the DER controller may include one or more relays for monitoring and/or controlling electrical components within the one or more. In In some embodiments, a DER controller may control the synchronization of two or more DERs that are distributed over large geographic regions separated by one or more electronical components that cause a phase delay. For example, high voltage transmission lines may have an inductive impedance that results in a phase delay from one end to another. Thus, the phase alignment of a DER at one geographic location on a grid may be different that the phase alignment of a DER at a distant geographic location on the grid. In some embodiments, the common time signal is used to eliminate or reduce gradual phase shift after a DER transitions from a grid-connected state to an islanded state.

In other embodiments, the common time signal may be part of a phase lock loop control signal and directly control the phase angle of a power conversion unit. In such an embodiment, when a plurality of DERs are in a grid-connected mode, each DER may monitor the grid proximate its grid-tie location(s) and/or a grid-tie location between an associated microgrid and a macrogrid to ensure continuous phase alignment of the power conversion unit(s). In an islanded mode, each DER may maintain synchronization of its power conversion unit(s) based on a synchronization signal based on the common time source. However, if DERs connected to the same microgrid or macrogrid are separated by components that introduce a phase shift (e.g., high voltage transmission lines, transformers, etc.), a DER controller may adjust the synchronization signal sent to each DER accordingly.

As previously noted, the DER controller may use information collected by IEDs or relays that monitor or measure power, frequency, voltage, current, phase angle, synchrophasors, etc. Again, the DER controller may use information collected from one or more intelligent electronic devices (IEDs) or relays throughout the grid or microgrid to ensure phase alignment of one or more DERs even during an islanded state, even when DERs are separated by large geographical distances and/or possibly separated by phase-shifting electrical components.

Thus, the DER controller may include a DER state identifier to determine the current state of the DER based on information from one or more monitoring IEDs or relays and a phase alignment controller to align the phase based on either direct measurements of the power grid (e.g., via a PT measurement device) or based on a common time source, depending on whether the DER is in a grid-connected state or an islanded state.

In one embodiment, a DER may include a power conversion unit that supplies power from the DER to a grid (e.g., a microgrid or directly to a macrogrid). While in a grid-connected mode, a phase lock loop of the power conversion unit may maintain phase synchronization based on a measurement from the grid (e.g., a conventional voltage transformer measurement of a utility grid). A DER controller may determine that the DER has entered an islanded state based on one or more microprocessor-based relays or other IEDs configured to monitor and/or protect the microgrid and/or macrogrid. In response to the detected islanded state, the DER controller may instruct the DER to maintain phase synchronization based on a common time source (e.g., an IRIG or PTP timing signal) instead of the grid measurement. Alternatively, the DER controller may directly provide a timing signal to the DER to maintain phase synchronization. In some embodiments, the DER controller may be associated with a single DER. In other embodiments, a single DER controller may control multiple DERs.

In various embodiments consistent with the present disclosure, the complexity of a control system configured to synchronize a plurality of DERs may be reduced by utilizing a common time signal available to a plurality of controllers to synchronize a plurality of DERs without the need for a common controller that receives signals from the plurality of DERs and without direct communication links between the DERs. In some embodiments, a plurality of controllers may receive a common time signal and autonomously control one or more DERs. The plurality of controllers may drive the DERs to a specified phase angle and frequency prior to being electrically connected using the common time signal. For example, an operator may specify an arbitrary phase angle (e.g., 0 degrees) and frequency (e.g., 60 Hz) based on the common time signal for one phase of an electrical power system. A first controller may then autonomously direct a first DER to the specified frequency and phase angle reference while a second controller directs a second DER to the specified frequency and phase angle. By synchronizing the DERs to the specified phase angle and frequency, the DERs may be inherently synchronized to each other independent of any direct communication between the devices. Moreover, the DERs may be synchronized to each other with a phase adjustment for variations in phase angle over large geographic distances based on measured characteristics of the local macrogrid or microgrid.

Certain embodiments disclosed herein may be used in connection with systems capable of functioning as "islanded systems." As the term is utilized herein, an islanded system, system in an islanded mode, or a system in an islanded state comprises any system in which electric power generators continue to provide electrical power in the absence of a connection to an electrical utility grid. For example, an islanded system may include a utility connected system that includes any distributed energy resource, including photovoltaic arrays, windmills, hydroelectric generators, distributed generation generators, fossil or nuclear fuel generators, or the like. An islanded system may utilize a power conversion unit to ensure phase alignment and other power characteristic matching for connection of the islanded system to the grid.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are generally designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. Well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

Figure 1:
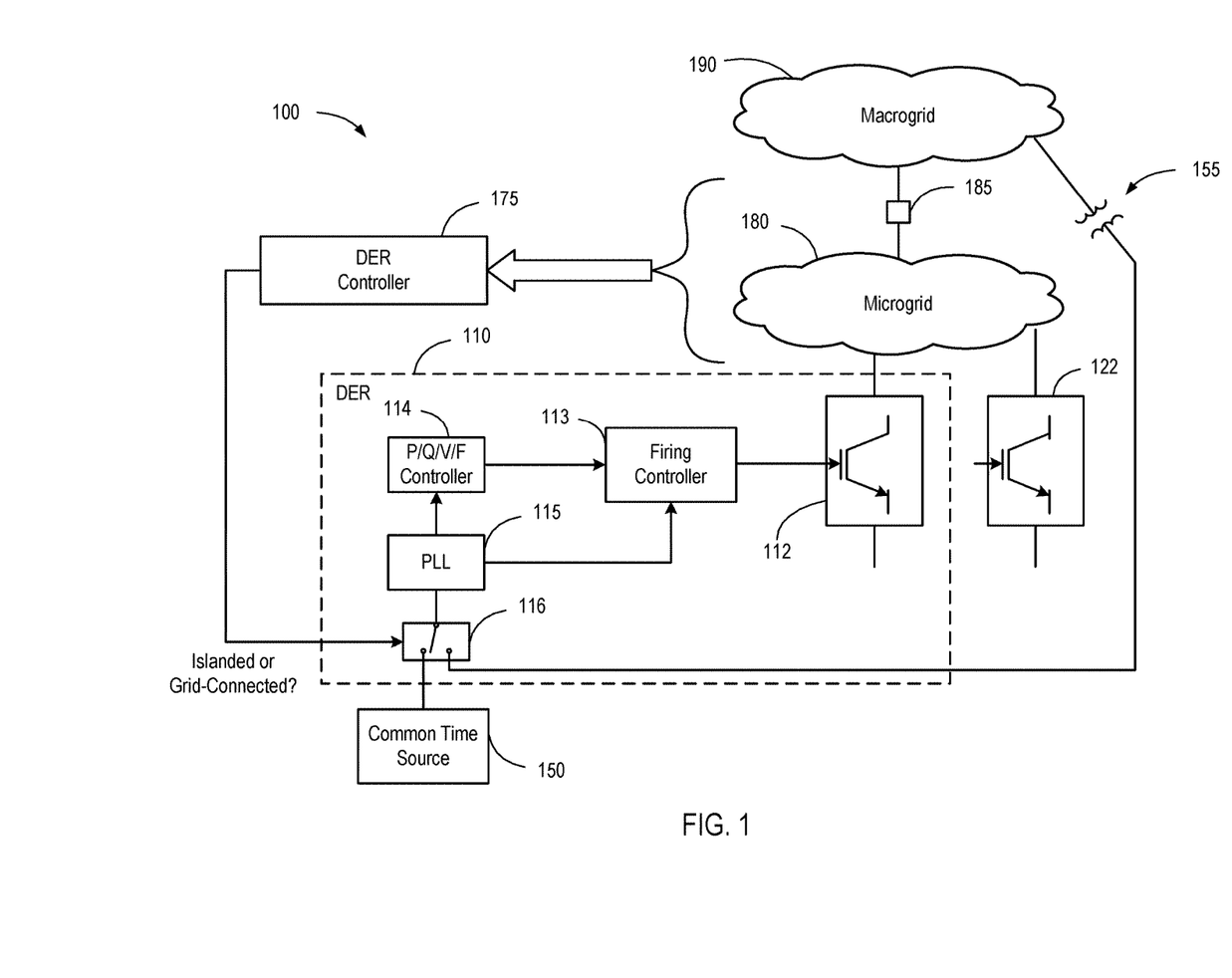
FIG. 1 illustrates a simplified electrical diagram of a control system for a distributed energy resource (DER) with a common time source, according to one embodiment.

FIG. 1 illustrates a simplified electrical diagram 100 of a DER controller 175 for a DER 110 connected to a common time source 150, according to one embodiment. As illustrated, a power conversion unit 112 may be connected to a microgrid 180. The microgrid 180 may be selectively connected to a macrogrid 190 via a breaker 185. The microgrid may receive power from other power conversion units 122. Each power conversion unit 112 and 122 may receive power from any of a wide variety of power sources, such as a photovoltaic array, a fossil fuel-based generator, or a windfarm.

A DER controller 175 may receive monitoring or measurement data from one or more IEDs (not illustrated) that monitor and/or measure various characteristics of the microgrid 180 and/or the macrogrid 190. Specifically, the DER controller 175 may receive data from a relay or other IED indicative of whether or not the Der 110 is connected to the macrogrid 190 via microgrid 180 and breaker 185.

In a grid-connected state, a switch 115 may receive phase angle information from the macrogrid, such as via monitoring PT (power transformer) 155. In the grid-connected state, a phase lock loop 115 may use the phase angle information from the monitoring PT 155 to control a P/Q/V/F controller 114 and a firing controller 113 to adjust a phase angle of the power conversion unit 112. As used herein in this context, the term "adjust" may refer to modifying the phase angle of the power conversion unit 112 to match that of the macrogrid 190 and/or maintaining the phase angle of the power conversion unit 112 to match that of the macrogrid 190.

In an islanded state, DER 110 may be disconnected from the microgrid 180 via a breaker (not show) and/or disconnected from the macrogrid 190 via breaker 185. The DER 110 may be considered islanded when it is disconnected from the macrogrid 190 even if the DER 110 continues to provide power to one or more loads on the microgrid 180. In an islanded state, switch 116 may receive a timing signal from the common time source 150 to control the phase angle of the power conversion unit 112 via phase lock loop 115, P/Q/V/F controller 114, and/or firing controller 113.

As illustrated, DER controller 175 may be instrumental in controlling switch 116. The DER controller 175 may include at least one communication port to receive monitoring information from the IEDs monitoring the microgrid and/or a macrogrid. The DER controller 175 may include a determination subsystem to determine periods during which the DER 110 of the microgrid is connected to the macrogrid 190 in a grid-connected state and periods during which the DER 110 is disconnected from the macrogrid 190 in an islanded state. A phase angle control system of the DER controller 175 may communicate with the switch 116 of the DER 110 to indicate that the 150 common time source should be used to maintain a phase angle of an output of a power conversion unit 112 based on determination that the DER is in the islanded state.

Figure 2:
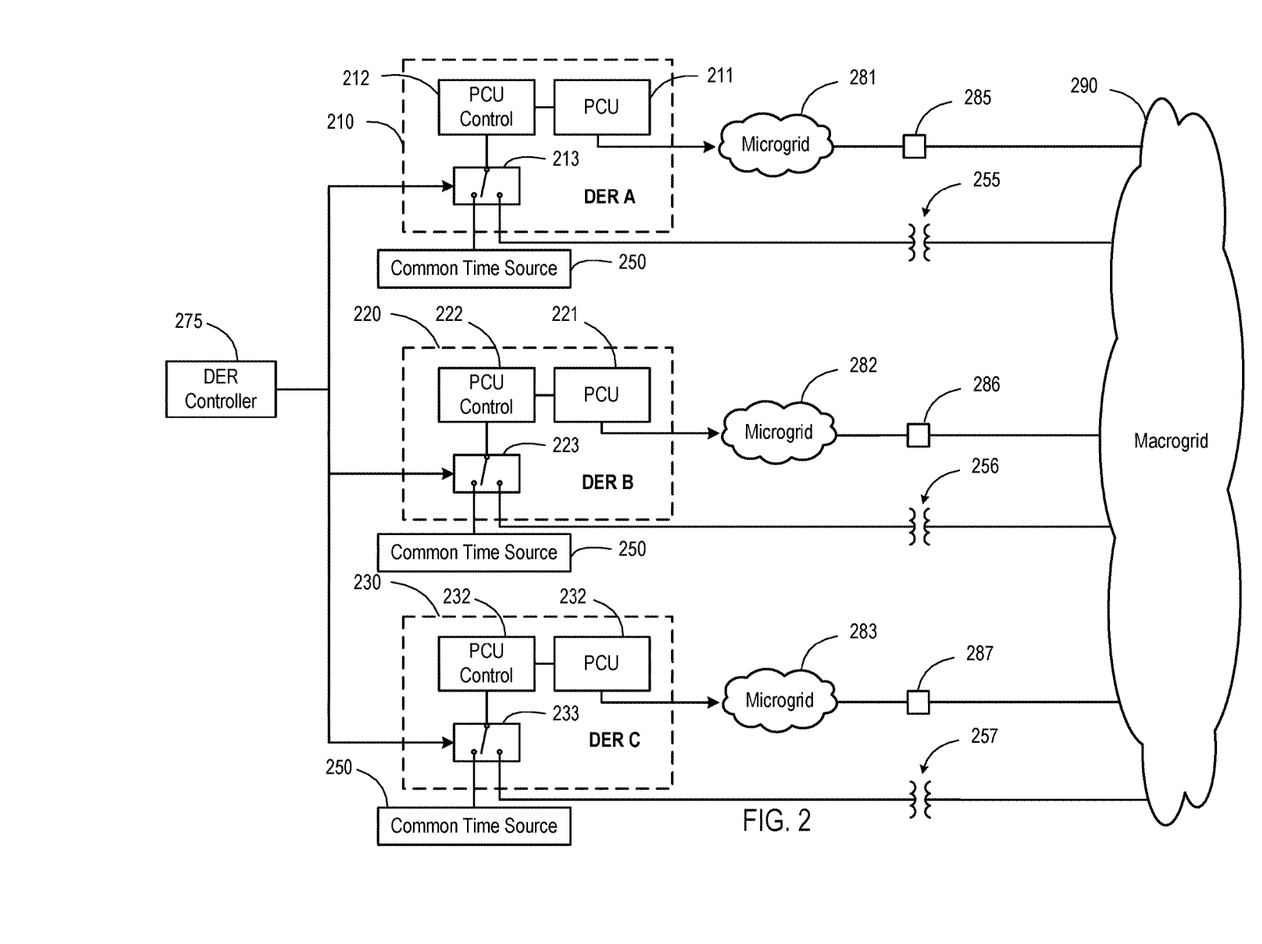
FIG. 2 illustrates another embodiment of an electrical system with a controller for multiple DERs and a common time source, according to one embodiment.

FIG. 2 illustrates another embodiment of an electrical system with a controller for multiple DERs 275 and a common time source 250 that is common to each DER (Der A 201; DER B 220; and DER C 230). The DER controller 275 may receive data from one or more IEDs indicating whether or not each DER 210, 220, and 230 is connected to the macrogrid 290 via breakers 285, 286, and 287.

Each microgrid 281, 282, and 283 may receive power from DERs 210, 220, and 230, respectively. In some embodiments, microgrids 281, 282, and 283 may be connected permanently, selectively connected and disconnected, or independent of one another (except as connected through macrogrid 290).

Each power conversion unit 211, 221, and 232 of each DER 210, 220, and 230, respectively, may receive power from any of a wide variety of power sources, such as a photovoltaic array, a fossil fuel-based generator, hydroelectric power, a windfarm, etc. The DER controller 275 may receive data from a relay or other IED indicative of whether or not each DER 210, 220, and 230 is connected to the macrogrid 290 or not.

The DER controller 275 may independently control each DER 210, 220, and 230 based on a determination of whether each particular DER is in an islanded state or a grid-connected state. In a grid-connected state, switches 213, 223, and 233 may receive phase angle information from the macrogrid, such as via monitoring PTs 255, 256, and 257. In the grid-connected state, phase control units (e.g., phase angle adjusters) 212, 222, and 232 may use the phase angle information from the monitoring PTs 255, 256, and 257 to control and/or adjust a phase angle of the power conversion units 211, 221, and 232. Again, the term "adjust" may refer to modifying the phase angle and/or maintaining the phase angle of a power conversion unit.

In islanded states, the DERs 210, 220, and 230 may be disconnected from the microgrids 281, 282, and 283, respectively, via breakers (not show) and/or disconnected from the macrogrid 190 via breakers 285, 286, and 287. DERs 210, 220, and 230 may be considered islanded even though they continue to provide power to a load on a microgrid that is itself islanded (disconnected) from the macrogrid. In some embodiments, a microgrid may be geographically large and include numerous loads of varying voltages and sizes. For example, a university or a factory may be part of a microgrid. In other embodiments, the microgrid may be simply a single load or even a path to sink or store excess power The DER controller 275 may include at least one communication port to receive monitoring information from the IEDs monitoring the microgrids 281, 282, and 283 and/or the macrogrid 290. The DER controller 275 may determine periods during which each DER 210, 220, and 230 is connected to the macrogrid 290 in a grid-connected state and periods during which each DER 210, 220, and 230 is disconnected from the macrogrid 290 in an islanded state. A phase angle control system of the DER controller 275 may communicate with the respective switches 213, 223, and 233 of each DER 210, 220, and 230 to indicate that the common time source 250 should be used to maintain a phase angle of an output of the power conversion units 211, 221, and 232 during islanded states.

Figure 3:
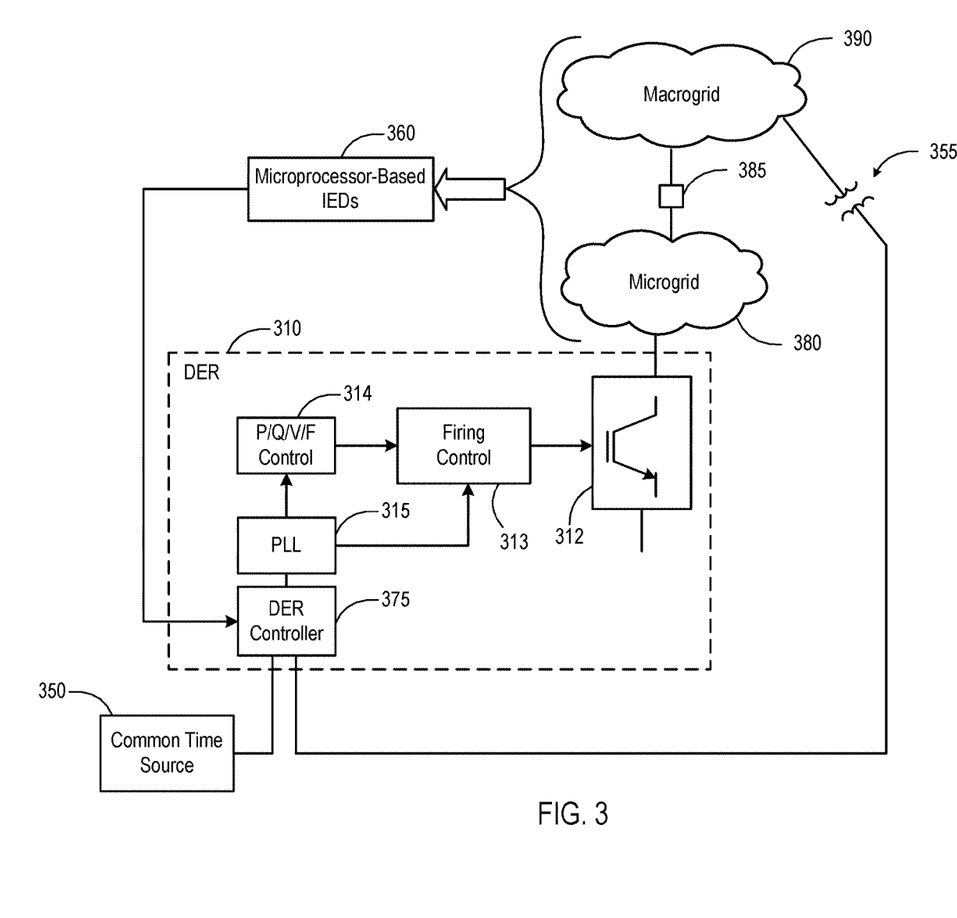
FIG. 3 illustrates an embodiment of a DER with an integrated DER controller and a common time source, according to one embodiment.

FIG. 3 illustrates an embodiment of a DER 310 with an integrated DER controller 375 and a common time source 350, according to one embodiment. As illustrated, the DER controller 375 receives information from microprocessor-based IEDs 360 that are monitoring macrogrid 390 and microgrid 380. DER controller 375 also receives a timing signal from a common time source 350 and phase angle measurement data of the macrogrid 390 via monitoring PT 355. The DER controller may utilize information from the microprocessor-based IEDs 360 to determine whether the DER 310 and microgrid 380 are islanded with respect to macrogrid 390 (e.g., breaker 385 is open) or if the DER 310 is grid-connected to the macrogrid 390.

In a grid-connected state, the DER controller 375 may use phase lock loop 315, P/W/V/F control 314, and firing control 313 to match the phase angle of the power conversion unit 312 with the phase angle of the macrogrid 390. In an islanded state, the DER controller 375 may use the common time source 350 to maintain the phase angle of the power conversion unit 312 as it continues to supply power to the microgrid 380.

Figure 4:
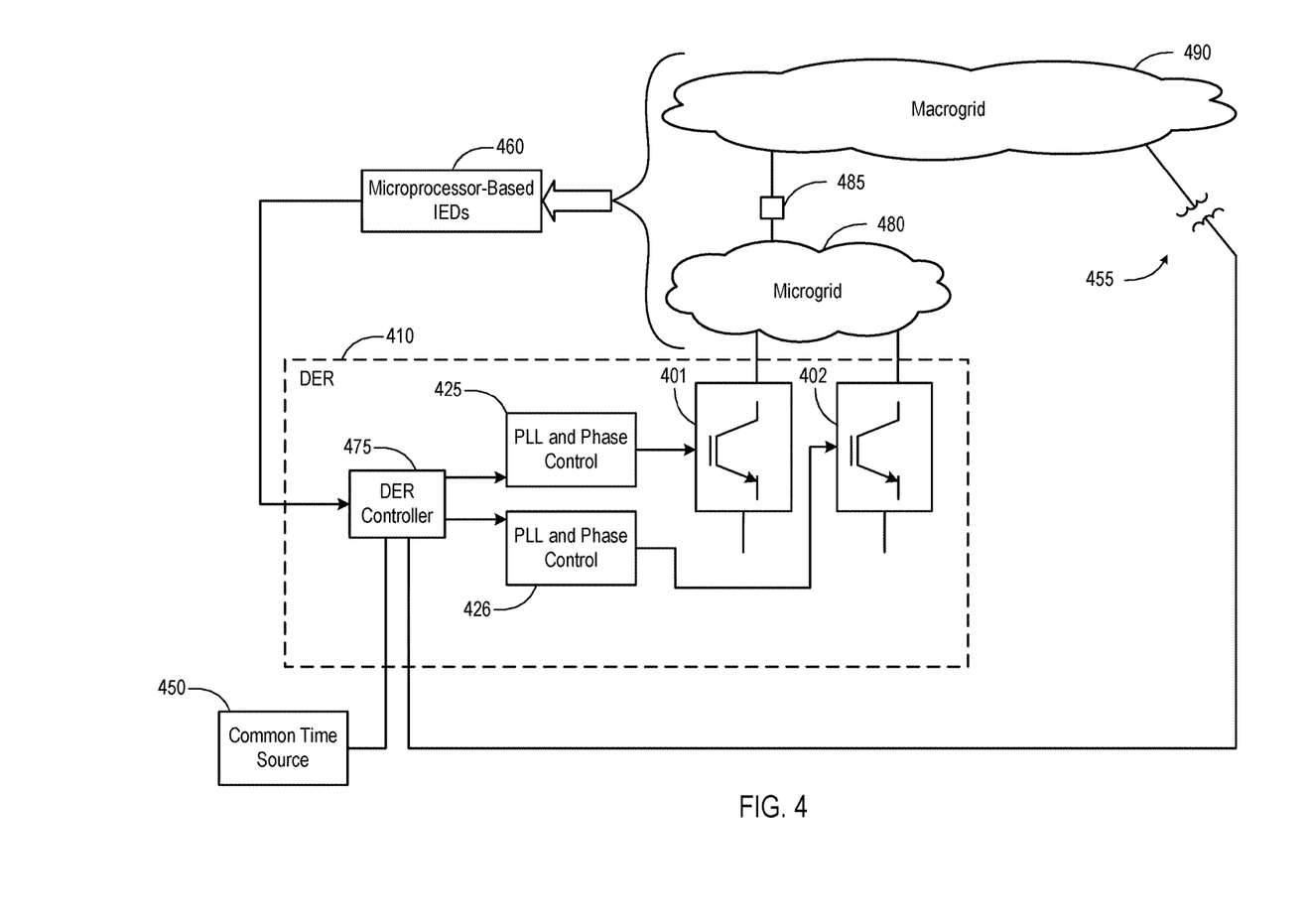
FIG. 4 illustrates an embodiment of a DER with multiple power conversion units and a common time source, where the DER is controlled by a common integrated DER controller, according to one embodiment.

FIG. 4 illustrates an embodiment of a DER 410 with two power conversion units 401 and 402. As illustrated, each power conversion unit 401 and 402 may have independent phase lock loops and phase control components 425 and 426. In some embodiments, power conversion units 401 and 402 may be geographically spaced but in common communication with the DER controller 475. The DER controller 475 may receive information from microprocessor-based IEDs 460 to determine whether the DER 410 is islanded from macrogrid 490 or grid-connected via, for example, breaker 485.

In a grid-connected state, the DER controller 475 may use data from monitoring PT 455 to match the phase angle of the power conversion units 401 and 402 with the phase angle of the macrogrid 490. In an islanded state, the DER controller 475 may use the common time source 450 to maintain the phase angle of the power conversion units 401 and 402 synchronized with each other even though they are each controlled by independent phase locked loops and phase controller components 425 and 426 as the DER 410 continues to supply power to the microgrid 480.

Figure 5:
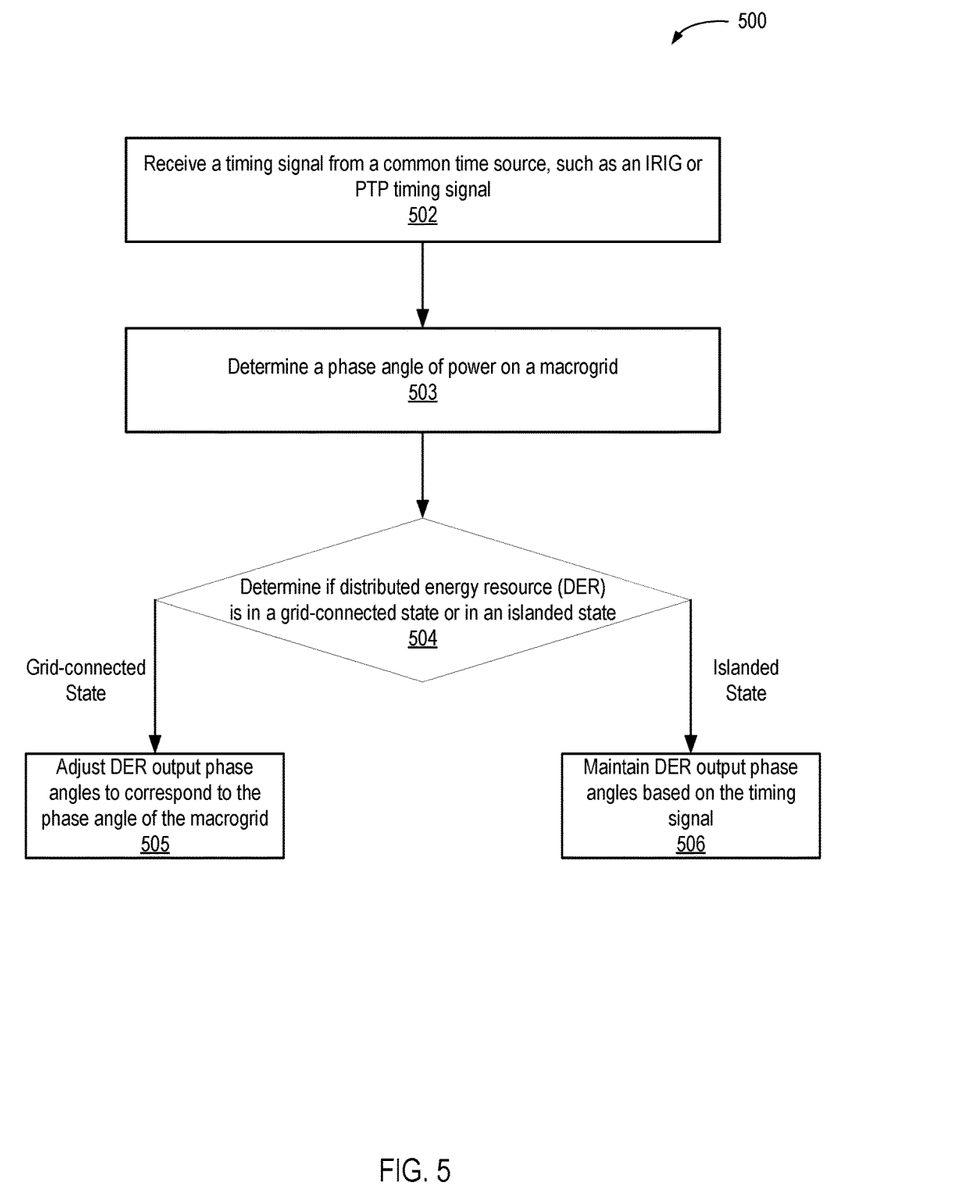
FIG. 5 illustrates a flow chart of an example method for selectively utilizing a common time source during a detected islanded state, according to one embodiment.

FIG. 5 illustrates a flow chart of an example method 500 for selectively utilizing a common time source during a detected islanded state, according to one embodiment. As illustrated, the system may receive a timing signal from a common time source, such as an IRIG or PTP timing signal, at 502. A phase angle of power on a macrogrid may be determined, at 503, such as via monitoring PTs configured to monitor a voltage of a utility grid transformer or phase line. If the DER is determined to be in a grid connected state, at 504, then the DER output phase angles may be matched with the phase angles of the macrogrid, at 505. If, however, the DER is determined to be in an islanded state, at 504, then the DER output phase angles may be maintained using the timing single, at 506, from the common time source. As previously described, determining whether or not the DER is islanded or grid-connected may be performed by a grid controller in communication with or utilizing integrated microprocessor-based IEDs configured to monitor various characteristics of a microgrid and/or macrogrid.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A method for phase alignment of a power conversion unit of distributed energy resource, comprising:
   receiving timing signal from an external common time source;
   receiving a signal from an external controller that a distributed energy resource (DER) is in a grid-connected state in which the output of one or more power conversion units of the DER are providing power to a power grid;
   determining a phase angle of power on the power grid;
   adjusting, while in the grid-connected state, a phase angle of the one or more power conversion units within the DER to correspond to the determined phase angle of the power on the power grid;
   receiving a signal from an external controller that the DER is in an islanded state in which the DER is no longer electrically connected to the power grid; and
   maintaining, while in the islanded state, the phase angle of the one or more power conversion units within the DER based on the received timing signal from the external common time source.

2. The method of claim 1, wherein receiving the timing signal from the external common time source comprises receiving one of an Inter-Range Instrumentation Group (IRIG) time code and/or Precision Time Protocol (PTP) signal.

3. The method of claim 1, wherein adjusting the phase angle of the one or more power conversion units comprises modifying one or more firing timings of one or more grid-tie inverters.

4. The method of claim 1, wherein determining the phase angle of power on the power grid comprises receiving data from a transformer measurement of the power grid.

5. The method of claim 1, wherein in the islanded state, the one or more power conversion units of the DER remain connected to a microgrid and are configured to continue to supply power to at least one load connected to the microgrid.

6. The method of claim 1, wherein the DER is electrically connected to the power grid via a microgrid, wherein the microgrid can be selectively disconnected from at least one of the power grid and the DER.

7. A controller for a power system comprising:
   at least one communication port to receive monitoring information from at least one intelligent electronic device (IED) monitoring at least one electrical component associated with at least one of a microgrid and a macrogrid;
a state determination subsystem to determine, based on received monitoring information from the IED, periods during which a distributed energy resource (DER) of the microgrid is connected to the macrogrid in a grid-connected state and periods during which the DER is disconnected from the macrogrid in an islanded state; and
a phase angle control system to indicate that a common time source should be used to maintain a phase angle of an output of a power conversion unit of the DER based on determination that the DER is in the islanded state.

8. The controller of claim 7, wherein the monitoring information received by the at least one communication port from the IED comprises at least one of: measurement data from a power transformer (PT) of at least one phase line of the macrogrid and data from a breaker monitoring relay.

9. The controller of claim 7, wherein the phase angle control system is configured to communicate with a phase lock loop controller of the DER.

10. The controller of claim 7, wherein the phase angle control system is further configured to provide a common time source signal to the DER.

11. A system comprising:
a plurality of distributed energy resources (DERs) selectively connected to a macrogrid, wherein each of the plurality of DERs comprises:
 a power conversion unit to convert power from one of a DC source and an AC source into output AC power for connection of the DER to the macrogrid;
 a phase angle adjuster to adjust the phase angle of the output AC power; and
 a common time source receiver to receive a common time source signal;
a plurality of IEDs configured to monitor at least a phase angle of the macrogrid and a connection state of each DER with the macrogrid; and
a DER controller in communication with each of the plurality of DERs, the DER controller configured to:
 identify a status of each DER as one of (i) grid-connected, in which the DER is connected to the macrogrid, or (ii) islanded, in which the DER is disconnected from the macrogrid; and
 direct the phase angle adjuster of each DER to synchronize the phase angle of output AC power with the phase angle of the macrogrid when the DER is grid-connected, and
 direct the phase angle adjuster of each DER to synchronize the phase angle of output AC power using the common time source signal when the DER is islanded.

12. The controller of claim 11, wherein the DER controller is further configured to selectively reconnect at least two of the islanded DERs to the macrogrid in parallel, wherein the at least two islanded DERs remained synchronized with the macrogrid while islanded via the phase angle adjuster using the common time source signal.

13. A system comprising:
a power conversion unit for a distributed energy resource (DER) to convert power from one of a DC source and an AC source into output AC power for connection of the DER to a power grid;
a phase angle adjuster to adjust the phase angle of the output AC power;
a DER state identifier to receive an indication that the DER is in one of (i) a grid-connected state in which the DER is connected to the power grid, or (ii) in an islanded state in which the DER is disconnected from at least a portion of the power grid; and
phase alignment controller in communication with the phase angle adjuster to cause the phase angle adjuster to adjust the phase angle of the output AC power based on:
 a measured value from the power grid in a grid-connected state, and
 a common time source signal in an islanded state.

14. The system of claim 13, wherein the phase angle adjuster comprises a phase locked loop.

15. The system of claim 13, wherein power conversion unit is configured to output AC power for connection of the DER to a power grid via a microgrid, wherein the microgrid has at least one load independent of the power grid.

16. The system of claim 13, wherein in the islanded state, the power conversion unit is configured to output AC power to the at least one independent load on the microgrid while electrically disconnected from the power grid.

17. The system of claim 13, wherein power conversion unit comprises a grid-tie inverter configured to convert DC power into output AC power.

18. The system of claim 17, wherein the phase angle adjuster comprises a phase locked loop connected to at least one of an internal thyristor and an insulated-gate bipolar transistor (IGBT) of the grid-tie inverter.

19. The system of claim 13, wherein the DER state identifier is configured to receive measurement data from an intelligent electronic device monitoring at least one electrical component associated with the power grid.

20. The system of claim 19, wherein the DER state identifier is configured to receive measurement data from an intelligent electronic device monitoring a voltage of a transformer on the power grid.

21. The system of claim 13, wherein the phase angle adjustor is configured to adjust the phase angle of the output AC power of the power conversion unit to match a phase angle from measured voltage of a transformer of the power grid when in the grid-connected state.

* * * * *